T. F. Shaffner,
Torpedoe.

No 3375. Reissued April 13. 1869.

Witnesses
James Devine
W. Tod Shaffner

Inventor
T. F. Shaffner

UNITED STATES PATENT OFFICE.

TALIAFERRO P. SHAFFNER, OF LOUISVILLE, KENTUCKY.

IMPROVED METHOD OF BLASTING WITH NITROLEUM.

Specification forming part of Letters Patent No. 60,573, dated December 18, 1866; reissue No. 3,375, dated April 13, 1869.

DIVISION B.

*To all whom it may concern:*

Be it known that I, TALIAFERRO P. SHAFFNER, of Louisville, Jefferson county, and State of Kentucky, have invented a new and Improved Mode of Blasting with Nitroleum; and I do declare that the following is a full and exact description thereof, reference being had to the accompanying drawings, and to the letters of reference marked thereon.

The nature of my discovery or invention consists in dividing the charge of nitroleum, commonly known as nitro-glycerine, making one for blasting and the other for tamping, the same being an improvement upon my Patent No. 51,674, dated 19th of December, 1865.

To enable others skilled in the art to make and use my invention or discovery, I will proceed to describe the process employed by me.

Blasting with nitroleum (a liquid substance commonly called nitro-glycerine, but named by me "nitroleum") has occasioned an observance of new conditions of tamping.

When powder is used, a very strong tamping of sand, or other suitable material, is employed. The sand is placed in the drill-hole over the powder, in small quantities, and compactly pressed by a tamping-iron and hammer. Gun-cotton requires the same conditions of tamping.

Nitroleum cannot be tamped solidly; being a liquid, the sand would mix with it, and the tamping-iron might produce a premature explosion. If it be placed in a metal or other kind of cartridge, the concussion might produce a similar effect. The usual process observed has disregarded any tamping whatever of the nitroleum; but a given amount is used to keep the fuse-plug in its place, to prevent its recoil before the nitroleum is exploded. The fuse-plug is charged with powder, which is ignited by an ordinary train-fuse, and the plug must lie in part in the liquid. Over the fuse-plug is poured sand or earth, and no tamping is usually given to the sand or earth. When the fuse-plug explodes, the force or heat given by the powder explodes the nitroleum. The force produces percussion, and the three hundred and sixty degrees of heat the temperature required to explode nitroleum. Water has been employed for tamping, and it has served some good, but only to a limited extent. To tamp nitroleum according to any of the hitherto known modes of tamping is too dangerous, as an explosion would be inevitable.

It is a fixed law in philosophy that explosive substances, when confined, have a disruptive force in proportion to the degree of confinement, quantity and resistance being respectively considered. So it is with nitroleum.

With a view to obtain the whole force of a charge of nitroleum placed in a drill-hole for a blast, I have invented a new mode of tamping, which has been very effective in blasting. I pour the nitroleum into the drill-hole, or I place a tin cartridge filled with it into the bottom of the hole, and near the top of the hole I place a tin canister with a small charge of nitroleum, which is to be ignited by a fuse. Suppose the drill-hole to be five feet deep, the blasting-charge will occupy one foot at the bottom; above will be three feet of space, then four inches for the tamping-charge; above will be eight inches of sand, slightly packed, so as to hold the fuse and tamping-charge in the position desired. The explosion of the upper or tamping charge will explode the lower or blasting charge. The tamping-charge confines the lower to its place, and the disruption of rock will be vastly greater. By this arrangement the gases act upon the rock at the bottom of the hole, though, to a certain extent, the tamping-charge helps to disrupt the rock at or near the top of the hole.

Sometimes I pour the nitroleum into the drill-hole, and then fill the hole with water; the former, being the heaviest, will lie at the bottom. At the top of the hole I place the tamping-charge, and, on its explosion, the blasting-charge at the bottom of the hole, beneath the water, will be exploded and completely tamped. The explosion of the tamping-charge forces the column of water against the lower charge, and thus, as a whole line of force, and by particle acting against particle, the required percussion and heat are produced, thus effecting the explosion of the blasting at the bottom of the hole beneath a column of four feet of water. In this manner I not only avail myself of the blasting and tamping charges to disrupt the rock or other matter, but I also secure the expansion of the water in the form of steam, usually estimated at seventeen hundred times its cube dimensions. This steam is generated instantaneously by the explosion of the nitro-glycerine, and acts with great bursting force, and, to some extent, serves to lift the rock or matter broken, as cannon to gunpowder.

From the preceding, it will be observed that I have two modes of blasting with nitroleum, viz: first, placing the charge at the bottom of the hole, with tamping-charge near the top, space existing between the blasting and the tamping charges; and, second, instead of the space, as in the first case, a column of water is substituted.

The drawings accompanying (as part of this specification) illustrate these respective modes.

Figure 1:
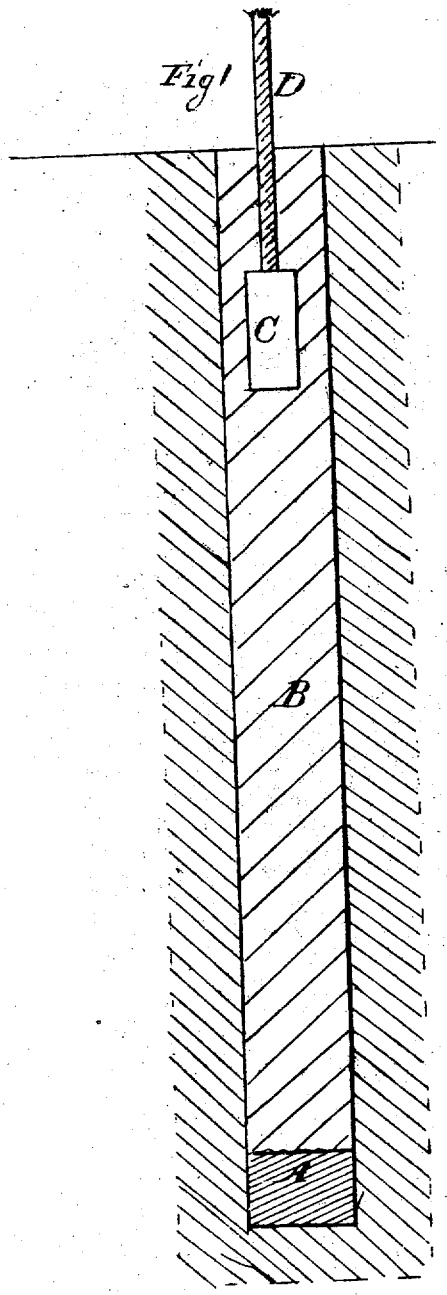
Figure 1 represents the drill-hole, with the blasting-charge A at the bottom, and above the hole is filled with water, B. The tamping-charge C is held in its place by any convenient means.
Figure 2:
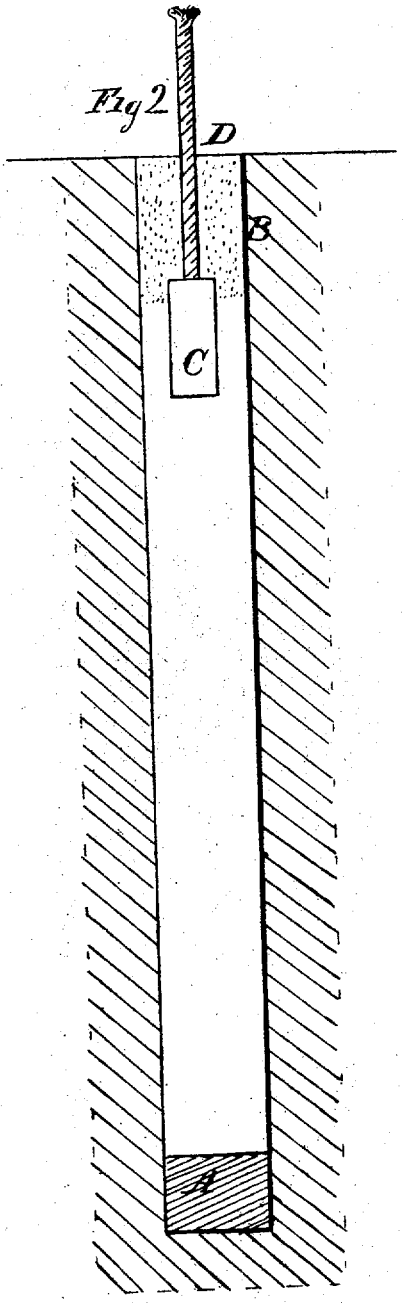
Fig. 2 represents a drill-hole with blasting-charge A at bottom, with space above to tamping-charge C. Above C is sand B, to hold the tamping-charge in its place.

In case the holes are placed in such a manner that the nitroleum cannot be poured therein, a tin canister can be employed, which, when filled and corked, can be placed at the bottom of the hole, and, if necessary, held there with clay, sand, or other suitable material.

Having now fully described the nature and process of my discovery or invention sufficiently full and distinct to enable one skilled in the art to execute the same, what I claim, and desire to secure by Letters Patent as my discovery or invention, is—

1. For blasting purposes, the use and interposition of a column of water between the tamping and blasting charges, when the same are arranged in the manner and for the purposes described.

2. As a method of blasting in rock, the adjustment and arrangements of the tamping and blasting charges in such manner that the former shall be placed at or near the surface or upper part of the drill-hole, while the latter is located at the bottom thereof, or in such a manner as that the gases of the two charges may be united, disrupting the rock in the manner and for the purposes hereinbefore described.

TAL. P. SHAFFNER.

Witnesses:
JAMES DEVEAU,
W. M. SHAFFNER.